(12) United States Patent
Jung et al.

(10) Patent No.: US 11,463,147 B2
(45) Date of Patent: Oct. 4, 2022

(54) METHOD AND APPARATUS FOR DETERMINING PHYSICAL UPLINK CHANNEL POWER CONTROL PARAMETER VALUES FOR USE AFTER A BEAM FAILURE RECOVERY

(71) Applicant: Lenovo (Singapore) Pte. Ltd., New Tech Park (SG)

(72) Inventors: Hyejung Jung, Northbrook, IL (US); Ebrahim MolavianJazi, Santa Clara, CA (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 11 days.

(21) Appl. No.: 17/208,171

(22) Filed: Mar. 22, 2021

(65) Prior Publication Data

US 2021/0211180 A1 Jul. 8, 2021

Related U.S. Application Data

(63) Continuation of application No. 16/599,269, filed on Oct. 11, 2019, now Pat. No. 10,992,366.

(51) Int. Cl.
*H04B 7/06* (2006.01)
*H04L 5/00* (2006.01)
(Continued)

(52) U.S. Cl.
CPC ......... *H04B 7/0695* (2013.01); *H04L 5/0051* (2013.01); *H04W 52/08* (2013.01);
(Continued)

(58) Field of Classification Search
CPC ..... H04B 7/0695; H04B 7/088; H04L 5/0051; H04W 52/08; H04W 52/10;
(Continued)

(56) References Cited

U.S. PATENT DOCUMENTS

2019/0074882 A1* 3/2019 Zhou ................... H04W 52/228
2020/0053724 A1* 2/2020 MolavianJazi ... H04W 72/0473

OTHER PUBLICATIONS

ZTE, "Summary for AI 7.1.5 NR UL power control in non-CA aspects", R1-1811859, 3GPP TSG RAN WG1 Meeting £94bis, Chengdu, China, Oct. 8-12, 2018.*

* cited by examiner

*Primary Examiner* — Afshawn M Towfighi
(74) *Attorney, Agent, or Firm* — Loppnow & Chapa (57) ABSTRACT

A method and apparatus is provided for determining physical uplink channel power control parameter values for use after a beam failure recovery. A physical random access channel with a spatial domain transmission filter associated with a selected downlink reference signal from a set of downlink reference signals configured for a link recovery is transmitted. A determination is made as to whether the selected downlink reference signal is configured for at least one of a set of uplink spatial relation configurations as a reference signal for an uplink spatial relation setting for a physical uplink channel transmission. A power control parameter value for the physical uplink channel transmission is determined. The physical uplink channel is transmitted with the spatial domain transmission filter associated with the selected downlink reference signal and the determined physical uplink channel power control parameter value.

19 Claims, 4 Drawing Sheets

Related U.S. Application Data (60) Provisional application No. 62/744,602, filed on Oct. 11, 2018.

(51) Int. Cl.
| | |
|---|---|
| *H04W 52/08* | (2009.01) |
| *H04W 52/10* | (2009.01) |
| *H04W 52/14* | (2009.01) |
| *H04W 52/36* | (2009.01) |
| *H04W 72/04* | (2009.01) |
| *H04W 74/08* | (2009.01) |

(52) U.S. Cl.
CPC ......... *H04W 52/10* (2013.01); *H04W 52/146* (2013.01); *H04W 52/36* (2013.01); *H04W 72/042* (2013.01); *H04W 72/046* (2013.01); *H04W 74/0866* (2013.01)

(58) Field of Classification Search
CPC . H04W 52/146; H04W 52/36; H04W 72/042; H04W 72/046; H04W 74/0866; H04W 52/48; H04W 76/19; H04W 74/0833; H04W 52/228; H04W 52/50; H04W 52/325

See application file for complete search history.

METHOD AND APPARATUS FOR DETERMINING PHYSICAL UPLINK CHANNEL POWER CONTROL PARAMETER VALUES FOR USE AFTER A BEAM FAILURE RECOVERY

FIELD OF THE INVENTION

The present disclosure is directed to a method and apparatus for determining physical uplink channel power control parameter values for use after a beam failure recovery, including whether to use a default power control parameter value or a power control parameter value associated with one of a set of previously known uplink spatial relation configurations.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

When the user equipment communicates with a particular access point associated with a particular cell, the distance between the user equipment and the access point can vary. The varying distance can affect the amount of attenuation that a signal may experience between the time that the signal is transmitted to the time that the signal is ultimately received. While at least one factor that can contribute to an amount of signal attenuation can be related to distance, it is possible that other factors, including environmental factors, may also impact the power level of a signal when the signal is received at its intended destination. Correspondingly, the relative power levels being used by the user equipment in communicating with the network via the access point using a wireless signal can be adjusted, as needed.

In some instances, there can be a delay in determining the desired power control adjustment state value, where often in a closed loop environment, through an iterative process, where the amount for the power to be adjusted at the signal's source can be updated until the desired power level is received at the signal's destination. As conditions between the transmitter and the receiver change, the amount of adjustment can be further updated to match the more recent operating conditions. In any event, there can be a delay associated with establishing an initial value related to identifying the desired amount of power adjustment, as well as a delay associated with any update to the previously determined power level to account for any changes in the operation of the transmitter relative to the intended receiver. Often times the delay associated with establishing an initial power level will be a longer than the time related with updating an already determined power level, depending upon the starting value selected as part of the iterative process.

In the event of a communication failure, such as a beam failure and a corresponding beam failure recovery, it can sometimes be necessary to establish a new initial power adjustment level value. However, the present inventors have recognized that in some instances, information related to the preceding connection prior to failure can be used to accelerate the arrival at the new initial determination of a power adjustment level related to the recovered connection, where better defining the circumstances in which prior information can be used to accelerate the determination of a new value for the power adjustment level may be beneficial.

SUMMARY

The present application provides a method in a user equipment for determining physical uplink channel power control parameter values for use after a beam failure recovery. The method includes transmitting a physical random access channel with a spatial domain transmission filter associated with a selected downlink reference signal from a set of downlink reference signals configured for a link recovery. A determination is made as to whether the selected downlink reference signal is configured for at least one of a set of uplink spatial relation configurations as a reference signal for an uplink spatial relation setting for a physical uplink channel transmission. A default power control parameter value for the physical uplink channel transmission is determined in response to determining the selected downlink reference signal is not configured for any of the set of uplink spatial relation configurations until the user equipment receives an activation of an uplink spatial relation configuration or a reconfiguration of an uplink spatial relation configuration. A power control parameter value is determined for the physical uplink channel transmission corresponding to the uplink spatial relation configuration with the selected downlink reference signal as the uplink spatial relation setting in response to determining the selected downlink reference signal is configured for at least one of the set of the uplink spatial relation configurations until the user equipment receives the activation of an uplink spatial relation configuration or the reconfiguration of an uplink spatial relation configuration. The physical uplink channel with the spatial domain transmission filter associated with the selected downlink reference signal and the determined physical uplink channel power control parameter value is then transmitted.

These and other features, and advantages of the present application are evident from the following description of one or more preferred embodiments, with reference to the accompanying drawings.

DETAILED DESCRIPTION OF THE PREFERRED EMBODIMENT(S)

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for determining physical uplink channel power control parameter values for use after a beam failure recovery.

Figure 1:
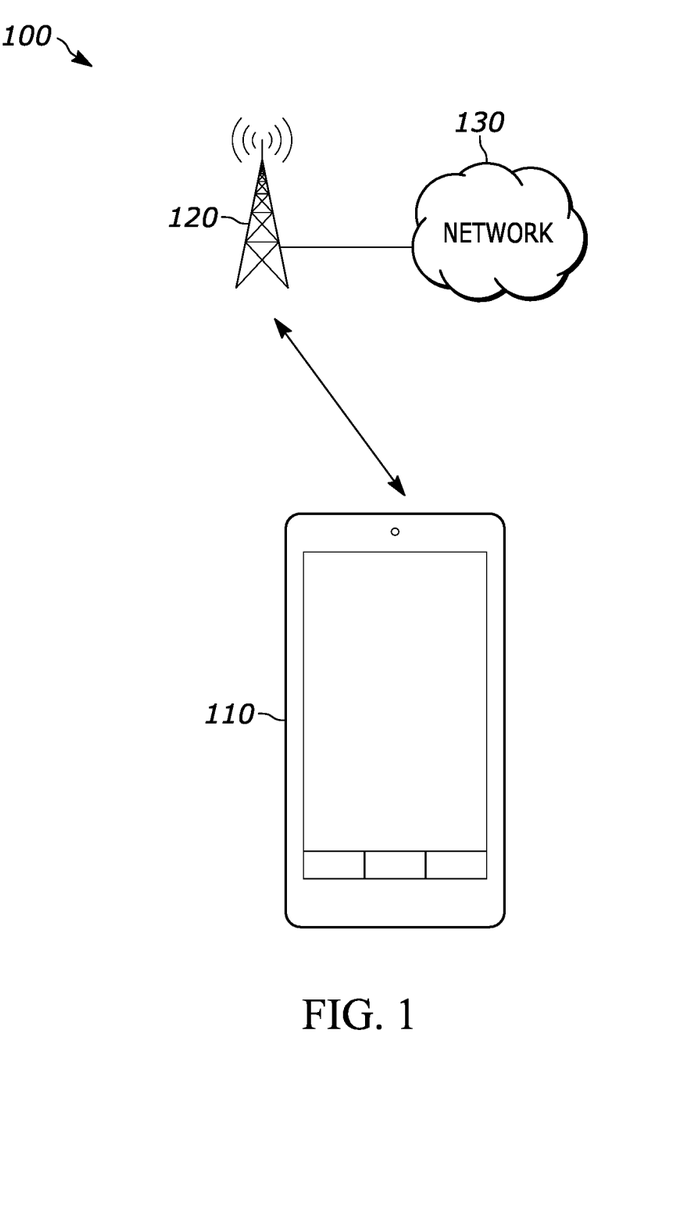
FIG. 1 is a block diagram of an exemplary network environment in which the present invention is adapted to operate.

FIG. 1 is an example block diagram of a system 100 according to a possible embodiment. The system 100 can include a wireless communication device 110, such as user equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

Previously, a working assumption had been accepted, regarding a physical uplink control channel (PUCCH) spatial filter setting after a user equipment's (UE's) successful reception of a beam failure recovery (BFR) response from a network entity (e.g. gNodeB). Since the UE performs beam recovery procedure in the radio resource control (RRC) CONNECTED mode, UE-specifically configured higher layer (e.g. RRC) parameters including PUCCH and physical uplink shared channel (PUSCH) configurations are often still available. However, due to a serving beam change resulting from successful BFR, previously configured physical uplink control channel (PUCCH) and physical uplink shared channel (PUSCH) power control parameters (e.g. Po, alpha, a pathloss reference signal(s), closed-loop power control adjustment state(s)) associated with a previous serving beam(s), i.e. the previously activated 'PUCCH-SpatialRelationInfo' parameter and/or the previously configured parameter 'SRS-ResourceSet' (which is set to 'codebook' or 'nonCodebook') and corresponding power control parameter(s) 'SRI-PUSCH-PowerControl', may not be suitable for PUSCH/PUCCH transmissions after completion of BFR.

The working assumption that had been accepted, provides that a predetermined K symbols after successfully receiving BFR gNB response, the PUCCH transmissions shall use the same spatial filter as the physical random access channel (PRACH) transmission until the UE receives an activation or reconfiguration of spatial relation of corresponding PUCCH resource(s). It was noted that the latency of RRC or medium access control (MAC) control element (CE) configuration is included as part of the time duration for applying the same spatial filter as the PRACH transmission, and that the above applies for all bandwidth part(s) (BWP (s)) corresponding to the primary cell (PCell) or the primary secondary cell (PSCell). The value of K was identified for further study, as well as to whether to apply this for contention based random access (CBRA).

In accordance with the present disclosure, methods to determine PUCCH and PUSCH power control parameters after successful completion of beam failure recovery procedure are being proposed.

For PUCCH power control after successful BFR, the following solutions have been proposed, where for example, until the UE receives an activation or reconfiguration of spatial relation of PUCCH resource(s), and when a corresponding PUCCH transmission uses a same spatial filter as a PRACH transmission for BFR, the corresponding PUCCH transmission can use one or more of uplink (UL) power control parameters, as follows.

P0 is given by the values corresponding p0setindex 0 of p0-pucch-set (i.e., q_u=0)

Pathloss is calculated according to one downlink reference signal (DL RS) associated with the PRACH transmission Closed loop index l=0 whether to apply this for contention based random access (CBRA) will be considered for further study.

In connection with this existing proposal, the P0 value corresponding p0setindex=0 of p0-pucch-set (i.e., q_u=0) is associated with one or more of previous serving beams, and may not be relevant to a newly selected beam during the BFR procedure. Similarly, the closed-loop power control process with index 0, i.e. l=0, (or the lowest index) might have been associated with different beams from the newly selected serving beam during the BFR procedure, and the existing closed-loop power control adjustment state value may not be relevant to the newly selected serving beam.

According to 3rd Generation Partnership Project (3GPP) technical specification (TS) 38.213, a UE-specific open-loop power control parameter $P_{O\_UE\_PUCCH}(q_u)$ for PUCCH transmission is determined as follows:

$P_{O\_PUCCH,b,f,c}(q_u)$ is a parameter composed of the sum of a component $P_{O\_NOMINAL\_PUCCH}$, provided by higher layer parameter p0-nominal for carrier f of primary cell c and, if provided, a component $P_{O\_UE\_PUCCH}(q_u)$ provided by higher layer parameter p0-PUCCH-Value in P0-PUCCH for active uplink (UL) BWP b of carrier f of primary cell c, where $0 \leq q_u < Q_u$. $Q_u$ is a size for a set of $P_{O\_UE\_PUCCH}$ values provided by higher layer parameter maxNrofPUCCH-P0-PerSet. The set of $P_{O\_UE\_PUCCH}$ values is provided by higher layer parameter p0-Set. If higher layer parameter p0-Set is not provided to the UE, $P_{O\_UE\_PUCCH}(q_u)=0$, $0 \leq q_u < Q_u$ If the UE is provided higher layer parameter PUCCH-SpatialRelationInfo, the UE obtains a mapping, by an index provided by higher layer parameter p0-PUCCH-Id, between a set of pucch-SpatialRelationInfoId values and a set of p0-PUCCH-Value values. If the UE is provided more than one values for pucch-SpatialRelationInfoId and the UE receives an activation command [11, TS 38.321] indicating a value of pucch-SpatialRelationInfoId, the UE determines the p0-PUCCH-Value value through the link to a corresponding p0-PUCCH-Id index. The UE applies the activation command 3 msec after a slot where the UE transmits hybrid authomatic re-transmission request acknowledgment (HARQ-ACK) information for the physical downlink shared channel (PDSCH) providing the activation command.

If the UE is not provided higher layer parameter PUCCH-SpatialRelationInfo, the UE obtains the p0-PUCCH-Value value from the P0-PUCCH with p0-PUCCH-Id value equal to 0 in p0-Set.

In addition, according to 3GPP TS38.213, a closed-loop power control adjustment state for PUCCH is determined as follows:

For the PUCCH power control adjustment state $g_{b,f,c}(i,l)$ for active UL BWP b of carrier f of primary cell c and PUCCH transmission occasion i $\delta_{PUCCH,b,f,c}(i,l)$ is a transmit power control (TPC) command value and is included in a downlink control information (DCI) format 1_0 or DCI format 1_1 for active UL BWP b of carrier f of the primary cell c that the UE detects for PUCCH transmission occasion i or is jointly coded with other TPC commands in a DCI format 2_2 with CRC scrambled by transmit power control-physical uplink control channel-radio network temporary identifier (TPC-PUCCH-RNTI) [5, TS 36.212], as described in Subclause 11.3

$l \in \{0,1\}$ if the UE is provided higher layer parameters twoPUCCH-PC-AdjustmentStates and PUCCH-SpatialRelationInfo and l=0 if the UE is not provided higher layer parameter twoPUCCH-PC-AdjustmentStates or PUCCH-SpatialRelationInfo If the UE obtains a TPC command value from a DCI format 1_0 or a DCI format 1_1 and if the UE is provided higher layer parameter PUCCH-SpatialRelationInfo, the UE obtains a mapping, by an index provided by higher layer parameter p0-PUCCH-Id, between a set of pucch-SpatialRelationInfoId values and a set of values for higher layer parameter closedLoopIndex that provide the l value(s). If the UE receives an activation command indicating a value of pucch-SpatialRelationInfoId, the UE determines the value closedLoopIndex that provides the value of l through the link to a corresponding p0-PUCCH-Id index.

In other words, during a UE's initial cell selection procedure, a UE is not provided with the UE-specific open-loop PUCCH power control parameter 'p0-Set' and accordingly, the UE-specific open-loop PUCCH power control parameter $P_{O\_UE\_PUCCH}(q_u)$ is set to be zero for PUCCH transmission. Furthermore, the UE maintains only one closed-loop PUCCH power control adjustment state.

According to a possible embodiment, after a UE initiates a beam failure recovery procedure by selecting a physical random access channel (PRACH) resource, transmitting a corresponding PRACH on the selected PRACH resource, and receiving a random access response message (for contention-based random access) or a BFR response message (for contention-free random access), the UE resets all configured PUCCH closed-loop power control adjustment states except a PUCCH closed-loop power control adjustment state of the 'closedLoopndex' which is indicated by (or included in) a parameter 'PUCCH-SpatialRelationInfo', wherein the parameter 'PUCCH-SpatialRelationInfo' indicates and/or includes a downlink reference signal such as a synchronization signal/physical broadcast channel (SS/PBCH) block or a channel state information-reference signal (CSI-RS) resource that the UE selected for PRACH resource selection as a value for the parameter 'referenceSignal'. That is, the UE resets the closed-loop power control adjustment states which are not associated with a newly selected serving beam(s) corresponding to the selected downlink (DL) reference signal (RS) for PRACH resource selection. If the downlink reference signal selected for PRACH resource selection is included in one of the configured 'PUCCH-SpatialRelationInfo' parameters, the UE continues using the closed-loop power control adjustment state corresponding to the 'closedLoopIndex' in the corresponding 'PUCCH-SpatialRelationInfo' parameter. In one example, if the downlink reference signal selected for PRACH resource selection is included in one of the configured 'PUCCH-SpatialRelationInfo' parameters, the UE continues to use the closed-loop power control adjustment state corresponding to the 'closedLoopIndex' in the corresponding 'PUCCH-SpatialRelationInfo' parameter if the value of the closed-loop power control adjustment state is greater than a given value (e.g., zero, the given value may be higher layer configured), otherwise the UE resets the closed-loop power control adjustment state corresponding to the 'closedLoopIndex'.

According to another possible embodiment, during a contention-based random access (CBRA) procedure in an RRC connected mode (including a beam failure recovery procedure), a UE can determine PUCCH power control parameters for message 4 (Msg4) hybrid automatic retransmission request (HARQ)-acknowledgement (ACK) feedback as follows:

If a DL RS selected for PRACH resource selection is not included as a value of the parameter 'referenceSignal' in any configured parameter 'PUCCH-SpatialRelationInfo', the UE sets the UE-specific open-loop PUCCH power control parameter $P_{O\_UE\_PUCCH}(q_u)$ to be zero and uses a closed-loop PUCCH power control adjustment state with the lowest index, i.e. l=0, after resetting the closed-loop power control adjustment state. Since the UE does not have any UE-specific power control parameter setting information for a new serving beam selected during the contention-based random access procedure, the UE sets PUCCH power control parameters similar to PUCCH power control during the initial cell selection procedure.

If the DL RS selected for PRACH resource selection is included as a value of the parameter 'referenceSignal' in one of the configured 'PUCCH-SpatialRelationInfo' parameters, the UE uses the power control parameters included in the corresponding 'PUCCH-SpatialRelationInfo' parameter for PUCCH transmission.

According to another possible embodiment, after successful completion of a beam failure recovery procedure (based on either contention-free or contention based random access) but before being re-configured with a new UE-specific configuration for the parameters 'PUCCH-PowerControl' and/or 'PUCCH-SpatialRelationInfo', a UE can determine PUCCH power control parameters as follows:

If a DL RS selected for PRACH resource selection is not included as a value of the parameter 'referenceSignal' in any configured parameter 'PUCCH-SpatialRelationInfo', the UE sets the UE-specific open-loop PUCCH power control parameter $P_{O\_UE\_PUCCH}(q_u)$ to be zero and uses a closed-loop PUCCH power control adjustment state with the lowest index, i.e. l=0, after resetting the closed-loop power control adjustment state. Since the UE does not have any UE-specific power control parameter setting information for a new serving beam selected during the BFR procedure, the UE sets PUCCH power control parameters similar to PUCCH power control during the initial cell selection procedure.

If the DL RS selected for PRACH resource selection is included as a value of the parameter 'referenceSignal' in one of the configured 'PUCCH-SpatialRelationInfo' parameters, the UE uses the power control parameters included in the corresponding 'PUCCH-SpatialRelationInfo' parameter for PUCCH transmission.

According to further possible embodiments, if more than one 'PUCCH-SpatialRelationInfo' parameters include the DL RS selected for PRACH resource selection as a value of the parameter 'referenceSignal', the UE uses the power control parameters included in the 'PUCCH-SpatialRelationInfo' parameter with the lowest index 'pucch-SpatialRelationInfoId' among the 'PUCCH-SpatialRelationInfo' parameters that include the DL RS selected for PRACH resource selection. This scenario can occur if a network entity configures multiple sets of power control parameters for a given DL RS resource (i.e. a given DL beam) to support different service/traffic types, e.g. enhanced mobile broadband (eMBB) and ultra-reliable ultra-low latency communication (URLLC). For Msg4 HARQ-ACK feedback, the power control parameters do not have to optimized for a specific service (e.g. URLLC). Thus, the UE can use the default power control parameter set which is included in the 'PUCCH-SpatialRelationInfo' parameter with the lowest index 'pucch-SpatialRelationInfoId'.

According to yet another possible embodiment, if the UE uses a DL RS of another serving cell different than the current serving cell (where the UE initiates BFR or random access procedure) for PRACH resource selection, the UE determines that the DL RS selected for PRACH resource selection is included in a 'PUCCH-SpatialRelationInfo' parameter, when both the value of the 'ServCellIndex' parameter and the value of 'referenceSignal' match for the selected DL RS.

According to other possible embodiments, if the UE is in the connected mode with 'p0-Set' configuration but the parameter 'PUCCH-SpatialRelationInfo' is not provided (e.g. operation in frequency range below 6 GHz), then UE's power control parameters do not have to be associated with a specific beam and accordingly, the UE can use open-loop power control parameters associated with the lowest index 'p0-PUCCH-Id'.

According to 3GPP TS 38.214, for PUSCH scheduled by DCI format 0_0 on a cell, the UE shall transmit PUSCH according to the spatial relation, if applicable, corresponding to the PUCCH resource with the lowest identity (ID) within the active uplink (UL) bandwidth part (BWP) of the cell, and the PUSCH transmission is based on a single antenna port. A spatial setting for a PUCCH transmission is provided by higher layer parameter PUCCH-SpatialRelationInfo if the UE is configured with a single value for higher layer parameter pucch-SpatialRelationInfoId; otherwise, if the UE is provided multiple values for higher layer parameter PUCCH-SpatialRelationInfo, the UE determines a spatial setting for the PUCCH transmission based on a received PUCCH spatial relation activation/deactivation Medium Access Control (MAC) Control Element (CE) as described in 3GPP TS 38.321. If PUSCH is scheduled by DCI format 0_1, the UE determines its PUSCH transmission precoder at least based on SRI (sounding reference signal resource indicator) given by the downlink control information (DCI) field of SRS resource indicator in Subclause 7.3.1.1.2 of 3GPP TS 38.212.

According to 3GPP TS38.213, a UE-specific open-loop power control parameter $P_{O\_UE\_PUSCH,f,c}(0)$ for PUSCH transmission is determined, as follows:

If a UE is not provided higher layer parameter P0-PUSCH-AlphaSet or for a Msg3 PUSCH transmission as described in Subclause 8.3, j=0, $P_{O\_UE\_PUSCH,f,c}(0)=0$, and $P_{O\_NOMINAL\_PUSCH,f,c}(0)P_{O\_PRE}+\Delta_{PREAMBLE\_Msg3}$, where the parameter preambleReceivedTargetPower [11, TS 38.321] (for $P_{O\_PRE}$) and msg3-DeltaPreamble (for $\Delta_{PREAMBLE\_Msg3}$) are provided by higher layers for carrier f of serving cell c.

For a PUSCH (re)transmission configured by higher layer parameter ConfiguredGrantConfig, j=1, $P_{O\_NOMINAL\_PUSCH,b,f,c}(1)$ is provided by higher layer parameter p0-NominalWithoutGrant, and $P_{O\_UE\_PUSCH,b,f,c}(1)$ is provided by higher layer parameter p0 obtained from p0-PUSCH-Alpha in ConfiguredGrantConfig that provides an index P0-PUSCH-AlphaSetId to a set of higher layer parameters P0-PUSCH-AlphaSet for active UL BWP b of carrier f of serving cell c.

For j∈{2, ..., J−1}=$S_j$, a $P_{O\_NOMINAL\_PUSCH,f,c}(j)$ value, applicable for all j∈$S_j$, is provided by higher layer parameter p0-NominalWithGrant for each carrier f of serving cell c and a set of $P_{O\_UE\_PUSCH,b,f,c}(j)$ values are provided by a set of higher layer parameters p0 in P0-PUSCH-AlphaSet indicated by a respective set of higher layer parameters p0-PUSCH-AlphaSetId for active UL BWP b of carrier f of serving cell c.

If the UE is provided by higher layer parameter SRI-PUSCH-PowerControl more than one values of p0-PUSCH-AlphaSetId and if DCI format 01 includes a SRI field, the UE obtains a mapping from higher layer parameter sri-PUSCH-PowerControlId in SRI-PUSCH-PowerControl between a set of values for the SRI field in DCI format 0_1 [5, TS 38.212] and a set of indexes provided by higher layer parameter p0-PUSCH-AlphaSetId that map to a set of P0-PUSCH-AlphaSet values. If the PUSCH transmission is scheduled by a DCI format 0_1 that includes a SRI field, the UE determines the value of $P_{O\_UE\_PUSCH,b,f,c}(j)$ from the p0-PUSCH-AlphaSetID value that is mapped to the SRI field value.

If the PUSCH transmission is scheduled by a DCI format 0_0 or by a DCI format 0_1 that does not include a SRI field, or if a higher layer parameter SRI-PUSCHPowerControl is not provided to the UE, j=2, and the UE determines $P_{O\_UE\_PUSCH,b,f,c}(j)$ from the value of the first higher layer parameter p0-Pusch-AlphaSet in p0-AlphaSets.

That is, for PUSCH power control, a UE follows the mapping between SRI to a power control parameter set {j,k,l} (j: an index for open-loop power control parameters, k: an index of pathloss reference signal, l: an index for a closed-loop power control adjustment state). If SRI is not present in DCI or if the higher layer parameter 'SRI-PUSCHPowerControl' is not provided to the UE, the UE uses a default power control parameter set {j=0, k=0, l=0}, i.e. the value of the first higher layer parameter 'p0-Pusch-AlphaSet' in 'p0-AlphaSets'.

According to another possible embodiment, after successful completion of beam failure recovery procedure, a UE resets all configured PUSCH closed-loop power control adjustment states except a PUSCH closed-loop power control adjustment state of the 'closedLoopIndex' which is indicated by (or included in) a parameter 'SRI-PUSCHPowerControl', wherein the parameter 'SRI-PUSCHPowerControl' is associated with an SRS resource, where the SRS resource is associated with a DL RS selected for PRACH resource selection.

According to another possible embodiment, after successful completion of a BFR procedure but before being reconfigured with a new UE-specific configuration for the parameters 'p0-AlphaSets' and/or 'SRI-PUSCHPowerControl', a UE can determine PUSCH power control parameters, as follows:

If a DL RS selected for PRACH resource selection is not associated with any previously configured SRS resource for PUSCH transmission, the UE sets the UE-specific open-loop PUCCH power control parameter $P_{O\_UE\_PUSCH,f,c}(0)$ to be zero and uses a closed-loop PUCCH power control adjustment state with the lowest index, i.e. l=0, after resetting the closed-loop power control adjustment state. Since the UE does not have any UE-specific power control parameter setting information for a new serving beam selected during the BFR procedure, the UE sets PUSCH power control parameters similar to PUSCH power control during the initial cell selection procedure.

If the DL RS selected for PRACH resource selection is associated with any previously configured SRS resource of a SRS resource set for PUSCH transmission, the UE determines the power control parameters according to the 'SRI-PUSCHPowerControl' parameter for the SRS resource associated with the selected DL RS.

According to another possible embodiment, after successful completion of a BFR procedure but before being re-configured with a new SRS resource set for PUSCH transmission, a UE shall use the same spatial filter as the PRACH transmission for PUSCH transmission until the UE receives an activation or reconfiguration of SRS resource set for PUSCH transmission, or reconfiguration of spatial relation of SRS resource set for PUSCH transmission.

Figure 2:
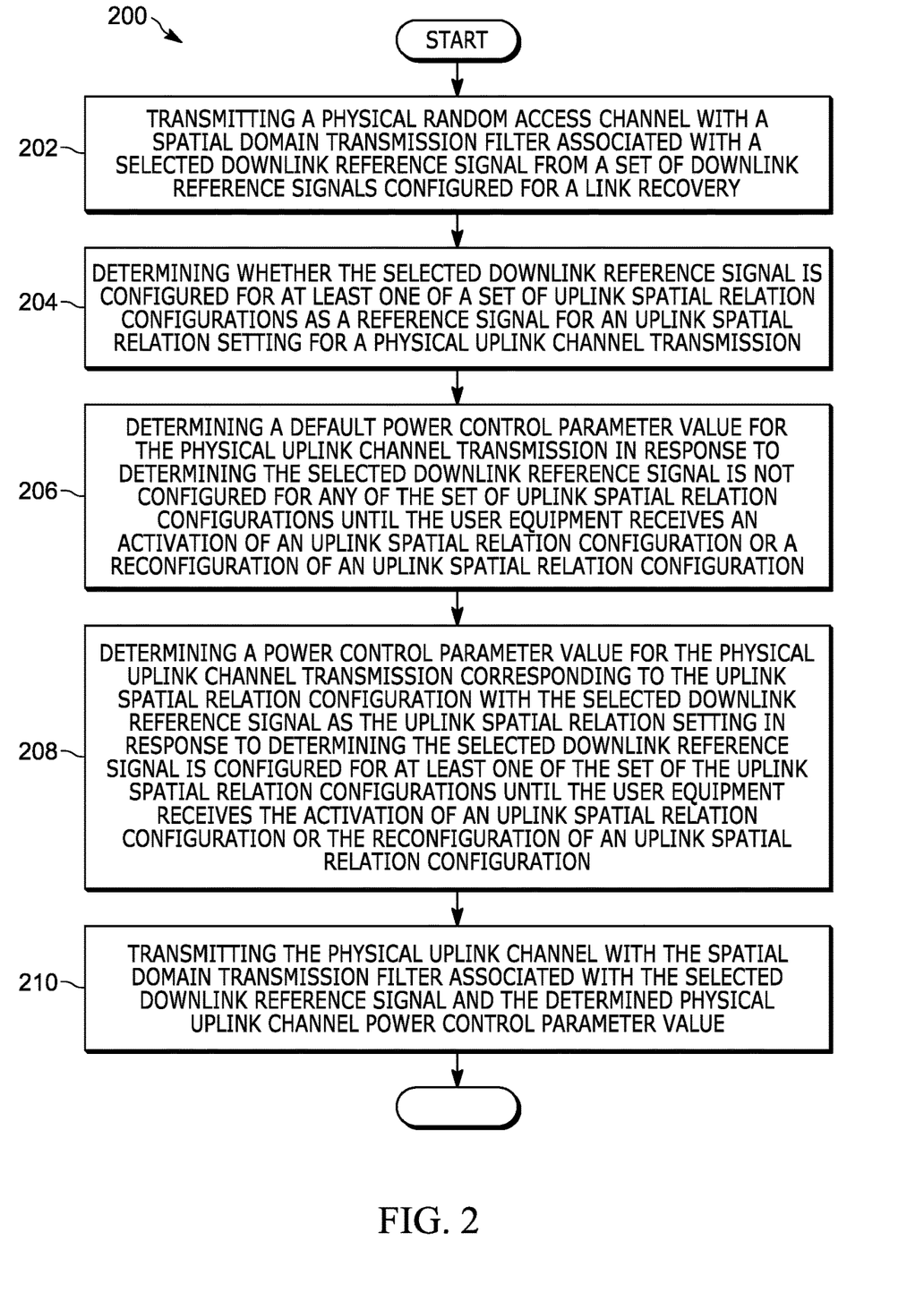
FIG. 2 is a flow diagram in a user equipment for determining physical uplink channel power control parameter values for use after a beam failure recovery.

FIG. 2 illustrates a flow diagram 200 in a user equipment for determining physical uplink channel power control parameter values for use after a beam failure recovery. The method includes transmitting 202 a physical random access channel with a spatial domain transmission filter associated with a selected downlink reference signal from a set of downlink reference signals configured for a link recovery. A determination 204 is made as to whether the selected downlink reference signal is configured for at least one of a set of uplink spatial relation configurations as a reference signal for an uplink spatial relation setting for a physical uplink channel transmission. A default power control parameter value for the physical uplink channel transmission is determined 206 in response to determining the selected downlink reference signal is not configured for any of the set of uplink spatial relation configurations until the user equipment receives an activation of an uplink spatial relation configuration or a reconfiguration of an uplink spatial relation configuration. A power control parameter value is determined 208 for the physical uplink channel transmission corresponding to the uplink spatial relation configuration with the selected downlink reference signal as the uplink spatial relation setting in response to determining the selected downlink reference signal is configured for at least one of the set of the uplink spatial relation configurations until the user equipment receives the activation of an uplink spatial relation configuration or the reconfiguration of an uplink spatial relation configuration. The physical uplink channel with the spatial domain transmission filter associated with the selected downlink reference signal and the determined physical uplink channel power control parameter value is then transmitted 210.

In some instances, transmitting the physical uplink channel comprises transmitting the physical uplink channel with the same spatial domain transmission filter as that used for reception of the selected downlink reference signal.

In some instances, determining the default power control parameter value for the physical uplink channel transmission in response to determining the selected downlink reference signal is not configured for any of the set of uplink spatial relation configurations includes determining a value for a user equipment specific open loop physical uplink channel power control parameter. In some of these instances, as part of determining the default power control parameter value for the user equipment specific open loop physical uplink channel power control parameter includes setting the value of the user equipment specific open loop physical uplink channel power control parameter to zero and using a physical uplink channel closed loop power control adjustment state with a lowest index value.

In some instances, receiving the activation of the uplink spatial relation configuration includes receipt of the activation by higher layers, where the higher layers include a medium access control layer and the activation received in a medium access control-control element layer.

In some instances, receiving the reconfiguration of the uplink spatial relation configuration includes receiving the reconfiguration of a spatialRelationInfoToAddModList parameter configured by higher layers. In some of these instances, the higher layer includes at least one of a medium access control layer and a radio resource control layer.

In some instances, the physical uplink channel is a physical uplink shared channel, and each of a set of sounding reference signal resources is associated with one of the set of uplink spatial relation configurations and maps to an SRI-PUSCHPowerControl configuration.

In some instances, the physical uplink channel is a physical uplink control channel, and the set of uplink spatial relation configurations is a set of physical uplink control channel spatial relation info configurations.

In some instances, determining the power control parameter value for the physical uplink channel transmission in response to determining the selected downlink reference signal is configured for at least one of the set of uplink spatial relation configurations includes determining a value for a user equipment specific open loop physical uplink channel power control parameter corresponding to an uplink spatial relation configuration of the at least one of the set of uplink spatial relation configurations. In some of these instances, as part of determining the power control parameter value for the user equipment specific open loop physical uplink channel power control parameter includes determining a physical uplink channel closed loop power control adjustment state and a pathloss reference signal corresponding to the uplink spatial relation configuration of the at least one of the set of uplink spatial relation configurations. After transmitting the physical random access channel, and upon receiving a response message, in some instances, the user equipment can reset all configured physical uplink channel closed-loop power control adjustment states except for the determined physical uplink channel closed-loop power control adjustment state.

In some instances, the selected downlink reference signal includes a synchronization signal/physical broadcast channel block as a reference signal for the uplink spatial relation setting, and the selected downlink reference signal used by the user equipment for physical random access channel resource selection.

In some instances, the selected downlink reference signal includes a channel state information-reference signal as a reference signal for the uplink spatial relation setting, and the selected downlink reference signal used by the user equipment for physical random access channel resource selection.

In some instances, in response to determining the selected downlink reference signal is configured for more than one of the set of the uplink spatial relation configurations, the user equipment uses the values for the power control parameters included in the uplink spatial relation configuration with the lowest uplink spatial relation index. In some of these instances, the more than one of the set of uplink spatial relation configurations are respectively associated with different service/traffic types.

In some instances, the selected downlink reference signal is a reference signal of another serving cell different than a current serving cell used for physical random access channel resource selection, and determining whether the selected downlink reference signal is configured for at least one of a set of the uplink spatial relation configurations comprises determining whether both the value of a serving cell index and the selected downlink reference signal is configured for at least one of a set of uplink spatial relation configurations.

In some instances, during the link recovery while in a connected mode, if the user equipment is not configured with any of the at least one of a set of uplink spatial relation configurations, then the user equipment determines the default power control parameter value for a user equipment specific open loop physical uplink channel power control parameter as the parameter value associated with a lowest index of a set of user equipment specific open loop physical uplink channel power control parameter values.

Figure 3:
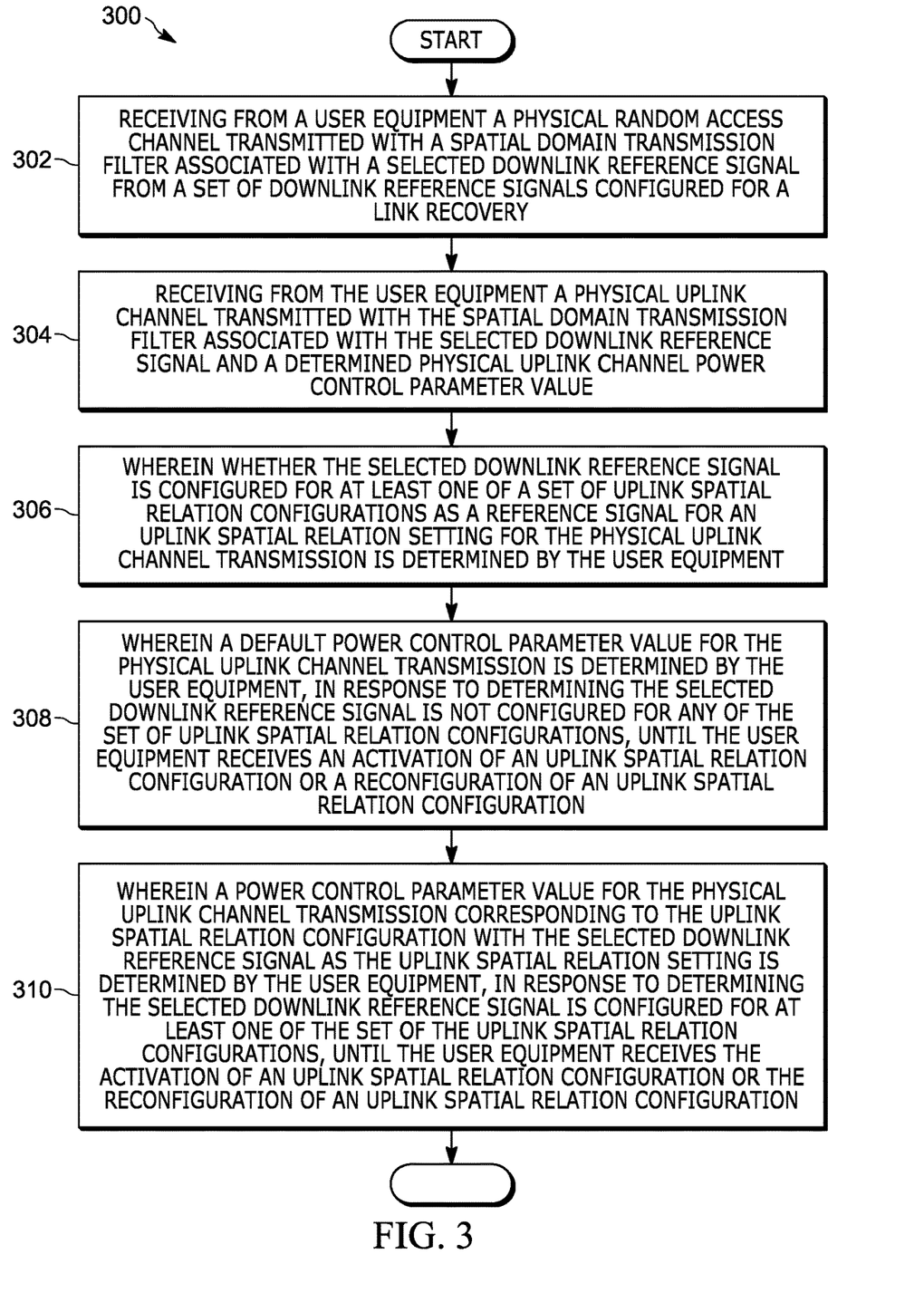
FIG. 3 is a flow diagram in a network entity associated with the determination of a physical uplink channel power control parameter values for use in the user equipment.

FIG. 3 illustrates a flow diagram 300 in a network entity associated with the determination of a physical uplink channel power control parameter values for use in the user equipment. The method includes receiving 302 from a user equipment a physical random access channel transmitted with a spatial domain transmission filter associated with a selected downlink reference signal from a set of downlink reference signals configured for a link recovery. A physical uplink channel transmitted with the spatial domain transmission filter associated with the selected downlink reference signal and a determined physical uplink channel power control parameter value is received 304 from the user equipment. Whether the selected downlink reference signal is configured for at least one of a set of uplink spatial relation configurations as a reference signal for an uplink spatial relation setting for the physical uplink channel transmission is determined 306 by the user equipment. A default power control parameter value for the physical uplink channel transmission is determined 308 by the user equipment, in response to determining the selected downlink reference signal is not configured for any of the set of uplink spatial relation configurations, until the user equipment receives an activation of an uplink spatial relation configuration or a reconfiguration of an uplink spatial relation configuration. A power control parameter value for the physical uplink channel transmission corresponding to the uplink spatial relation configuration with the selected downlink reference signal as the uplink spatial relation setting is determined 310 by the user equipment, in response to determining the selected downlink reference signal is configured for at least one of the set of the uplink spatial relation configurations, until the user equipment receives the activation of an uplink spatial relation configuration or the reconfiguration of an uplink spatial relation configuration.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 4:
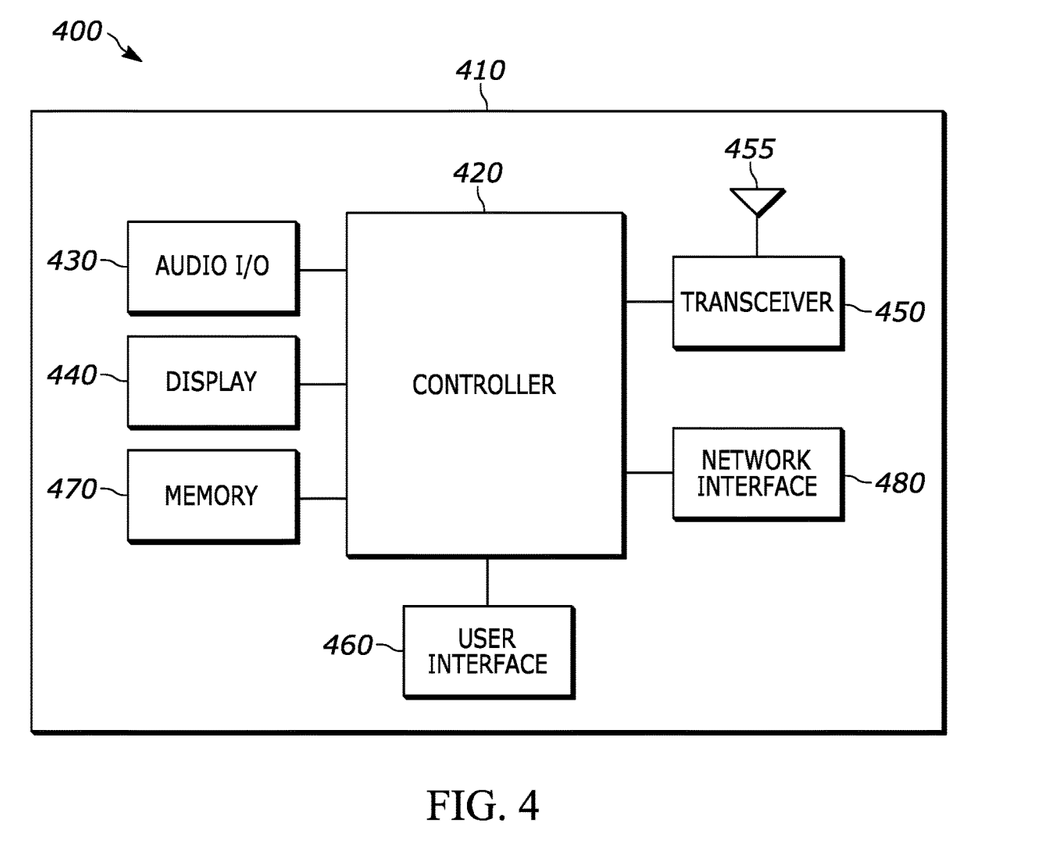
FIG. 4 is an example block diagram of an apparatus according to a possible embodiment.

FIG. 4 is an example block diagram of an apparatus 400, such as the wireless communication device 110, according to a possible embodiment. The apparatus 400 can include a housing 410, a controller 420 within the housing 410, audio input and output circuitry 430 coupled to the controller 420, a display 440 coupled to the controller 420, a transceiver 450 coupled to the controller 420, an antenna 455 coupled to the transceiver 450, a user interface 460 coupled to the controller 420, a memory 470 coupled to the controller 420, and a network interface 480 coupled to the controller 420. The apparatus 400 can perform the methods described in all the embodiments The display 440 can be a viewfinder, a liquid crystal display (LCD), a light emitting diode (LED) display, a plasma display, a projection display, a touch screen, or any other device that displays information. The transceiver 450 can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 470 can include a random access memory, a read only memory, an optical memory, a solid state memory, a flash memory, a removable memory, a hard drive, a cache, or any other memory that can be coupled to an apparatus.

The apparatus 400 or the controller 420 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 470 or elsewhere on the apparatus 400. The apparatus 400 or the controller 420 may also use hardware to implement disclosed operations. For example, the controller 420 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an apparatus and implementing the disclosed embodiments. Some or all of the additional elements of the apparatus 400 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of", "at least one selected from the group of", or "at least one selected from" followed by a list is defined to mean one, some, or all, but not necessarily all of, the elements in the list. The terms "comprises", "comprising", "including", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that comprises the element. Also, the term "another" is defined as at least a second or more. The terms "including", "having", and the like, as used herein, are defined as "comprising". Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a network entity comprising:
receiving from a user equipment a physical random access channel transmitted with a spatial domain transmission filter associated with a selected downlink reference signal from a set of downlink reference signals configured for a link recovery; and
receiving from the user equipment a physical uplink channel transmitted with the spatial domain transmission filter associated with the selected downlink reference signal and a determined physical uplink channel power control parameter value;
wherein whether the selected downlink reference signal is configured for at least one of a set of uplink spatial relation configurations as a reference signal for an uplink spatial relation setting for the physical uplink channel transmission is determined by the user equipment;
wherein a default power control parameter value for the physical uplink channel transmission is determined by the user equipment, in response to determining the selected downlink reference signal is not configured for any of the set of uplink spatial relation configurations, until the user equipment receives an activation of an uplink spatial relation configuration or a reconfiguration of an uplink spatial relation configuration; and
wherein a power control parameter value for the physical uplink channel transmission corresponding to the uplink spatial relation configuration with the selected downlink reference signal as the uplink spatial relation setting is determined by the user equipment, in response to determining the selected downlink reference signal is configured for at least one of the set of the uplink spatial relation configurations, until the user equipment receives the activation of an uplink spatial relation configuration or the reconfiguration of an uplink spatial relation configuration.

2. The method in accordance with claim 1, wherein the user equipment transmits the physical uplink channel with the same spatial domain transmission filter as that used for reception of the selected downlink reference signal.

3. The method in accordance with claim 1, wherein determining of the default power control parameter value by the user equipment for the physical uplink channel transmission in response to determining the selected downlink reference signal is not configured for any of the set of uplink spatial relation configurations includes determining by the user equipment a value for a user equipment specific open loop physical uplink channel power control parameter.

4. The method in accordance with claim 3, wherein as part of determining the default power control parameter value for the user equipment specific open loop physical uplink channel power control parameter includes setting by the user equipment the value of the user equipment specific open loop physical uplink channel power control parameter to zero and using a physical uplink channel closed loop power control adjustment state with a lowest index value.

5. The method in accordance with claim 1, wherein receiving the activation of the uplink spatial relation configuration by the user equipment includes receipt of the activation by higher layers, where the higher layers include a medium access control layer and the activation being received by the user equipment in a medium access control-control element layer.

6. The method in accordance with claim 1, wherein receiving the reconfiguration of the uplink spatial relation configuration by the user equipment includes receiving by the user equipment the reconfiguration of a spatialRelationInfoToAddModList parameter configured by higher layers.

7. The method in accordance with claim 6, wherein the higher layer includes at least one of a medium access control layer and a radio resource control layer.

8. The method in accordance with claim 1, wherein the physical uplink channel is a physical uplink shared channel, and each of a set of sounding reference signal resources is associated with one of the set of uplink spatial relation configurations and maps to an SRI-PUSCHPowerControl configuration.

9. The method in accordance with claim 1, wherein the physical uplink channel is a physical uplink control channel, and the set of uplink spatial relation configurations is a set of physical uplink control channel spatial relation info configurations.

10. The method in accordance with claim 1, wherein determining the power control parameter value for the physical uplink channel transmission by the user equipment in response to determining the selected downlink reference signal is configured for at least one of the set of uplink spatial relation configurations includes determining by the user equipment a value for a user equipment specific open loop physical uplink channel power control parameter corresponding to an uplink spatial relation configuration of the at least one of the set of uplink spatial relation configurations.

11. The method in accordance with claim 10, wherein as part of determining the power control parameter value for the user equipment specific open loop physical uplink channel power control parameter by the user equipment includes determining by the user equipment a physical uplink channel closed loop power control adjustment state and a pathloss reference signal corresponding to the uplink spatial relation configuration of the at least one of the set of uplink spatial relation configurations.

12. The method in accordance with claim 11, wherein after receiving the physical random access channel, and upon transmitting a response message by the network entity, the user equipment resets all configured physical uplink channel closed-loop power control adjustment states except for the determined physical uplink channel closed-loop power control adjustment state.

13. The method in accordance with claim 1, wherein the selected downlink reference signal includes a synchronization signal/physical broadcast channel block as a reference signal for the uplink spatial relation setting, and the selected downlink reference signal used by the user equipment for physical random access channel resource selection.

14. The method in accordance with claim 1, wherein the selected downlink reference signal includes a channel state information-reference signal as a reference signal for the uplink spatial relation setting, and the selected downlink reference signal used by the user equipment for physical random access channel resource selection.

15. The method in accordance with claim 1, wherein in response to determining the selected downlink reference signal is configured for more than one of the set of the uplink spatial relation configurations by the user equipment, the user equipment uses the values for the power control parameters included in the uplink spatial relation configuration with the lowest uplink spatial relation index.

16. The method in accordance with claim 15, wherein the more than one of the set of uplink spatial relation configurations are respectively associated with different service/traffic types.

17. The method in accordance with claim 1, wherein the selected downlink reference signal is a reference signal of another serving cell different than a current serving cell used for physical random access channel resource selection, and determining by the user equipment whether the selected downlink reference signal is configured for at least one of a set of the uplink spatial relation configurations comprises determining by the user equipment whether both the value of a serving cell index and the selected downlink reference signal are configured for at least one of a set of uplink spatial relation configurations.

18. The method in accordance with claim 1, wherein during the link recovery, while in a connected mode, if the user equipment is not configured with any of the at least one of a set of uplink spatial relation configurations, then the user equipment determines the default power control parameter value for a user equipment specific open loop physical uplink channel power control parameter as the parameter value associated with a lowest index of a set of user equipment specific open loop physical uplink channel power control parameter values.

19. A network entity for communicating with a user equipment, the network entity comprising:
  a controller; and
  a transceiver that receives from the user equipment a physical random access channel transmitted with a spatial domain transmission filter associated with a selected downlink reference signal from a set of downlink reference signals configured for a link recovery, and receives from the user equipment a physical uplink channel transmitted with the spatial domain transmission filter associated with the selected downlink reference signal and a determined physical uplink channel power control parameter value;
  wherein whether the selected downlink reference signal is configured for at least one of a set of uplink spatial relation configurations as a reference signal for an uplink spatial relation setting for the physical uplink channel transmission is determined by the user equipment;
  wherein a default power control parameter value for the physical uplink channel transmission is determined by the user equipment, in response to determining the selected downlink reference signal is not configured for any of the set of uplink spatial relation configurations, until the user equipment receives an activation of an uplink spatial relation configuration or a reconfiguration of an uplink spatial relation configuration; and
  wherein a power control parameter value for the physical uplink channel transmission corresponding to the uplink spatial relation configuration with the selected downlink reference signal as the uplink spatial relation setting is determined by the user equipment, in response to determining the selected downlink reference signal is configured for at least one of the set of the uplink spatial relation configurations, until the user equipment receives the activation of an uplink spatial relation configuration or the reconfiguration of an uplink spatial relation configuration.

* * * * *